United States Patent
Miyamoto et al.

[11] Patent Number: 5,982,738
[45] Date of Patent: Nov. 9, 1999

[54] OPTICAL RECORDING MEDIUM HAVING AT LEAST WOBBLED SYNCHRONOUS INFORMATION SHARED BETWEEN TRACKS

[75] Inventors: Harukazu Miyamoto, Kodaira; Hirofumi Sukeda, Tokorozawa; Motoyasu Terao, Tokyo; Hiroyuki Minemura, Yokohama; Tetsuo Andou, Kokubunji, all of Japan

[73] Assignees: Hitachi, Ltd.; Hitachi Maxwell, both of Tokyo, Japan

[21] Appl. No.: 08/733,924

[22] Filed: Oct. 18, 1996

Related U.S. Application Data

[63] Continuation-in-part of application No. 08/600,730, Feb. 13, 1996.

[30] Foreign Application Priority Data

Oct. 19, 1995 [JP] Japan .................................... 7-270872
Nov. 20, 1995 [JP] Japan .................................... 7-300961

[51] Int. Cl.⁶ ........................................................ G11B 7/24
[52] U.S. Cl. ............................................................ 369/275.3
[58] Field of Search ............................. 369/275.1–275.4, 369/94, 44.13

[56] References Cited

U.S. PATENT DOCUMENTS

| | | | |
|---|---|---|---|
| 4,949,331 | 8/1990 | Maeda et al. | 369/275.3 |
| 5,448,552 | 9/1995 | Onagi | 369/275.4 |
| 5,493,552 | 2/1996 | Kobori | 369/275.4 |
| 5,499,229 | 3/1996 | Murakami et al. | 369/275.4 |

FOREIGN PATENT DOCUMENTS

| | | |
|---|---|---|
| 49-103515 | 10/1974 | Japan . |
| 1-229428 | 9/1989 | Japan . |
| 6-176404 | 6/1994 | Japan . |
| 6-243468 | 9/1994 | Japan . |
| 61-294640 | 12/1996 | Japan . |
| 62-183037 | 11/1997 | Japan . |

Primary Examiner—Nabil Hindi
Attorney, Agent, or Firm—Antonelli, Terry, Stout & Kraus, LLP

[57] ABSTRACT

An optical recording medium includes grooves and lands on a substrate in which prepits are disposed on an extension of the boundary between a groove and a land such that they are located uniformly on both sides of the center line of the groove or the land and that they do not exist on the both sides of any specific position of the center line of the groove or the land. Through this, at least synchronous information would be obtained with ease and tracking offset would be decreased.

11 Claims, 7 Drawing Sheets

OPTICAL RECORDING MEDIUM HAVING AT LEAST WOBBLED SYNCHRONOUS INFORMATION SHARED BETWEEN TRACKS

CROSS-REFERENCE TO RELATED APPLICATION

This is a Continuation-in-Part application of U.S. application Ser. No. 08/600,730, filed Feb. 13, 1996 the disclosure of which is hereby incorporated by reference.

BACKGROUND OF THE INVENTION

The present invention relates to an optical recording medium and more particularly to a high-density optical recording medium having a track width smaller than an optical spot diameter.

An example of a medium for performing high-density (narrow track) recording is disclosed in, for example, JP-A-6-176404. According to this example, in an optical recording medium having grooves and lands which are formed on a substrate and information recording areas which are formed in association with both the groove and the land, prepits are disposed on a virtual extension line of the boundary between a groove and a land. In particular, the prepits are located on only one side of any specific position of the center line of each groove.

With this construction, recording information is formed on both the groove and the land, the prepits have charge of address data representative of the recording areas and one prepit is used in common to a pair of adjacent groove and land to provide address data therefor. When the technique as above is applied to, for example, a phase change recording medium or a magneto-optical recording medium, interference of information (crosstalk) between adjacent lands or grooves due to the optical interference effect within an optical spot can be prevented, thereby permitting narrowing of track.

On the other hand, in the prepit area free from the optical interference effect, the address data can be common to the paired groove and land and the effective track pitch can be increased to reduce crosstalk.

In the example of JP-A-6-176404, however, the disposition of the prepit area is offset on one side of the center line of the groove or land, so that when an optical spot is caused to track a groove or a land, a tracking error (tracking offset) increases, making it difficult to perform high-density recording in which the track pitch is narrowed.

SUMMARY OF THE INVENTION

The present invention achieves elimination of the above problems and it is a first object of the present invention to provide an optical recording medium which can suppress the tracking offset to a value or level which is sufficiently low for the practical use and permit efficient disposition of address data even when recording is effected on both the groove and the land.

A second object of the present invention is to provide a high-density optical recording medium which can ensure simple mastering and easy replica preparation and can permit decoding even when a readout error takes place.

To accomplish the above first object, the following expedients are employed.

(1) Grooves and lands are formed on a substrate of a recording medium, information recording areas are formed in association with both the groove and the land, and prepits are disposed on a virtual extension line of the boundary between a groove and a land.

The disposition of prepits satisfies the following requirements (a) to (c) at the same time.

(a) Prepits are located on both sides of a virtual extension of the center line of a groove;
(b) Prepits are located on both sides of a virtual extension of the center line of a land;
(c) Prepits are not located on the both sides of any specific position of the center line of a groove; and
(d) Prepits are not located on the both sides of any specific position of a land.

With this construction, the arrangement of prepits is not offset on either one side of a virtual extension of the center line of the groove or the land to ensure that tracking offset hardly occurs and the prepits do not exist on both sides of any specific position of the center line of the groove or the land to prevent interference of prepit information between adjacent tracks from taking place within a reproduced spot so as to permit high-density narrow track recording.

(2) When prepits are disposed in the circumferential direction such that those on one side of a groove are not discriminative from those on the other side or those on one side of a land are not discriminative from those on the other side, at least consecutive two dispositions of prepits associated with the groove or the land are made to be different from each other to provide the same disposition of prepits periodically every two dispositions.

As the other option, (3) A groove associated with at least one pair of pits disposed on both sides of the center line of the groove in a prepit area and an adjacent groove not associated with pits disposed on both sides of the center line of this groove within the prepit area are disposed alternately in the radial direction.

Through this, by merely reproducing the pits, prepits associated with the groove can be discriminated from those associated with the land to improve reliability of information recording reproduction.

(4) Either one of synchronous information and address data is represented by prepits disposed on either one of the both sides of a groove.

As the other option, (5) Only one of synchronous information and address data is represented by prepits arranged on one side of a groove and both the synchronous information and the address data are represented by prepits arranged on the other of the both side of the groove.

Through this, address data can be reproduced under accurate synchronization. In addition, since the phase margin between prepits on the both sides can be extended, fabrication of a recording medium can be facilitated.

(6) The groove and the prepit have the same depth which is 70 nm or less. More preferably, the depth is 40 nm or more and 60 nm or less.

With this construction, an advantage of suitable crosstalk cancellation can be obtained between the groove and the land and besides an excellent tracking servo signal can be obtained. Formation and fabrication of the recording medium can be facilitated. With the groove depth exceeding 70 nm, the formation of the groove is difficult to achieve. When the groove depth is about 50 nm, the tracking servo is maximized and with the groove depth being about 50±10 nm, substantially the same effect can be attained.

(7) The groove and the land have substantially the same width which is between 0.3 $\mu$m and 0.75 $\mu$m.

With this construction, excellent tracking is compatible with high-density recording. If the groove and land have a width of not greater than 0.3 µm, then two of the groove and land will be confined within one optical spot and an excellent tracking signal cannot be obtained. On the other hand, if the groove and land have a width exceeding 0.75 µm, then effective high-density recording cannot be permitted.

(8) Of prepits, the smallest one has a diameter which is smaller than a width of each of the groove and the land. More preferably, the diameter is in the range from 0.25 µm to 0.55 µm.

Through this, an excellent prepit signal can be obtained without crosstalk. With the diameter being not greater than 0.25 µm, the prepit signal decreases in the extreme and with the diameter exceeding 0.55 µm, crosstalk is generated.

In the present invention, prepits are arranged on the both sides of a virtual extension line of the center line of a groove or a land in the optical spot scanning direction. Consequently, offset is decreased to make the tracking offset hardly occur and the prepits do not exist on the both sides of any specific position of the center line of the groove or the land to ensure that interference of prepit information between adjacent tracks within a reproduced spot can be prevented and high-density narrow track recording can be permitted.

Further, even in the presence of tracking offset, the amount of tracking offset can be detected accurately by comparing amplitudes of signals representative of prepits on the both sides. Accordingly, by feedback-controlling the information indicative of a comparison result to a scanning unit, the tracking offset can be suppressed.

At a portion between a groove and a prepit area, between a land and a prepit area or between prepit areas, a gap takes place when a prepit train on a virtual extension line of the boundary between a groove and a land shifts to a prepit train on an adjacent virtual extension line. The aforementioned JP-A-6-176404, however, does not take the gap into consideration Accordingly, in the absence of the gap or with the gap being very short, mastering of the substrate cannot be proceeded with by one-beam cutting and requires two-beam cutting Further, during replica preparation, injection must be applied to a steep pattern, leading to a decrease in yield. In addition, during reproduction of signals, tolerance to distortion of the reproduced spot and the tracking offset is decreased and a readout error is liable to occur.

To accomplish the second object, the following expedients are employed.

(1) Grooves and lands are formed on a substrate and prepits are arranged on a virtual extension of the boundary between a groove and a land. In particular, the prepits are disposed on both sides of an extension of the center line of a groove or a land and therefore, the optical axis of a laser beam must be moved during cutting. An acoustic-optical deflector (AOD) is used to change the optical axis. But it takes a time for the AOD to cause the optical axis to reach a desired optical axis position after transmitting a signal for optical axis change and when a modulated laser beam is irradiated along the intact optical axis, pits are formed obliquely on the substrate Accordingly, no pattern is formatted between the groove or the land and the succeeding prepits to provide a gap and an acoustic-optical modulator (AOM) is cut off corresponding to the gap to prevent laser irradiation and pit drawing. Thus, the substrate can be fabricated with a simple cutting machine. In addition, since a number of unevennesses are not formed on a narrow area on the substrate, the yield during preparation of replica can be increased.

(2) In the disposition in which prepits are arranged on a virtual extension of the boundary between a groove and a land, when the disposition of a prepit train on one side of a virtual extension of the boundary between the groove and the land is exchanged with the disposition of a prepit train on the other side or vice versa, the trailing edges of prepit trains on the respective one sides are aligned with each other in the radial direction of the substrate. The succeeding pit trains are spaced from those trailing edge positions in the circumferential direction or the recording/reproducing direction and the trailing edges of the succeeding pit trains are aligned with each other similarly. When the formed gap meets the recording rule, the substrate as a whole can be formatted conveniently and portions devoid of pits can be collected at a specified area on the substrate, thereby solving problems involved in cutting and replica preparation for reasons described previously.

(3) Radially adjacent pit trains each having only original information pits cannot be aligned with each other at the trailing edge in the radial direction. Accordingly, new pits are added to ensure the alignment of the trailing edges in the radial direction while observing the rule during recording.

(4) In the shift of the disposition of a pit train from one side to the other as described in the above (2), leading edges of pits in the disposition on the other side can be aligned in the radial direction to solve the problems involved in cutting and replica preparation for the same reasons set forth in the (2). In particular, from the standpoint of signal reproduction, a synchronous signal is allotted to pit information immediately after the shift of the pit train so that decision of a channel bit at the specified position may be thought much of, thereby ensuring that the tolerance to the leading edge position can be increased and a possibility that erroneous reading of important data of, for example, address at the position immediately before the shift of a pit train can be decreased.

DESCRIPTION OF THE PREFERRED EMBODIMENTS

Embodiment 1 (Optical Recording Medium)

Figure 1:
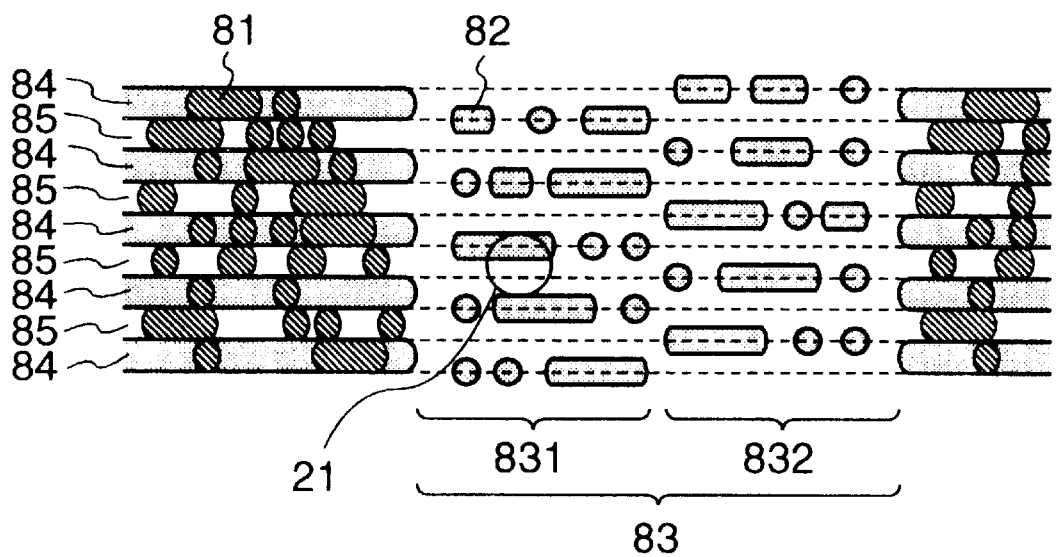
FIG. 1 is an enlarged fragmentary plan view of a first embodiment of an optical recording medium according to the present invention.

Referring now to FIG. 1, there is illustrated, in enlarged fragmentary plan view form, an optical recording medium of the present invention Grooves 84 each having a width of 0.6 µm and a depth of 50 nm and lands 85 each having a width of 0.6 µm are arranged alternately in the radial direction of the medium and recorded marks 81 are formed on the two kinds of areas. In other words, each of the groove 84 and land 85 serves as a recording area. In a prepit area 83, any groove is not formed but pits 82 are disposed on an extension of the boundary between a land and a groove. Each of the pits has a width of 0.35 µm and a depth of 50 nm. The prepit area is divided into a first prepit area 831 and a second prepit area 832. In the first prepit region 831, pits 82 are disposed on the upper side, as viewed in the drawing, of the center line of the land 85 and in the second prepit area 832, pits 82 are disposed on the lower side, as viewed in the drawing, of the center line of the land 85. Accordingly, when an optical spot 21 scans, for example, the land 85, pits on only either one of the sides are always reproduced and there is no fear that crosstalk will occur between adjacent tracks. Therefore, address data recorded in the form of the prepits can duly be reproduced without crosstalk.

Since the pits 82 do not adjoin to each other in the radial direction, they can be formed with ease. Also, pits 82 are uniformly disposed on both sides of a track (a land or a groove) and hence the influence on a tracking servo signal, which is caused by the pits 82, can be canceled. Accordingly, the tracking offset can be suppressed to a sufficiently small level.

Further, when reproducing, for example, a land 85, reproduction of address data at the second prepit area 832 is carried out continuously with reproduction of address data at the first prepit area 831. Accordingly, when the two areas are united into one area in which information is arranged to provide address data for one track, an address (track number) of a land and that of a groove can be set independently of each other. In other words, by sequentially reproducing the address data pieces in the first and second prepit areas 831 and 832, discrimination between the land and the groove can be ensured.

More particularly, for reproduction of the groove, address data represented by prepits arranged in the first prepit area is made to be identical to that represented by prepits arranged in the second prepit area but for reproduction of the land, address data represented by prepits in the first prepit area is made to be different from that represented by prepits in the second area. When addresses represented by prepits in the first and second prepit areas are different from each other, a correlation may be set up between the two addresses and the efficiency of error correction code can be increased by utilizing the correlation.

Preferably, synchronous information (VFO) 86 and address data 87 may both be arranged in each of the first and second prepit areas.

While in this example the prepit area is divided into two of the first and second prepit areas, the number of division which is plural may suffice. For example, when the number of division is four, pits in first and third prepit areas may be arranged on one side of a groove and pits in the second and fourth prepit areas may be arranged on the other side of the groove. By increasing the number of division of the prepit area, reliability against, for example, defects can be improved.

Here, a phase change recording material (GeSbTe) is used for the recording film. Accordingly, the recorded mark is formed in the form of an amorphous domain.

Figure 3:
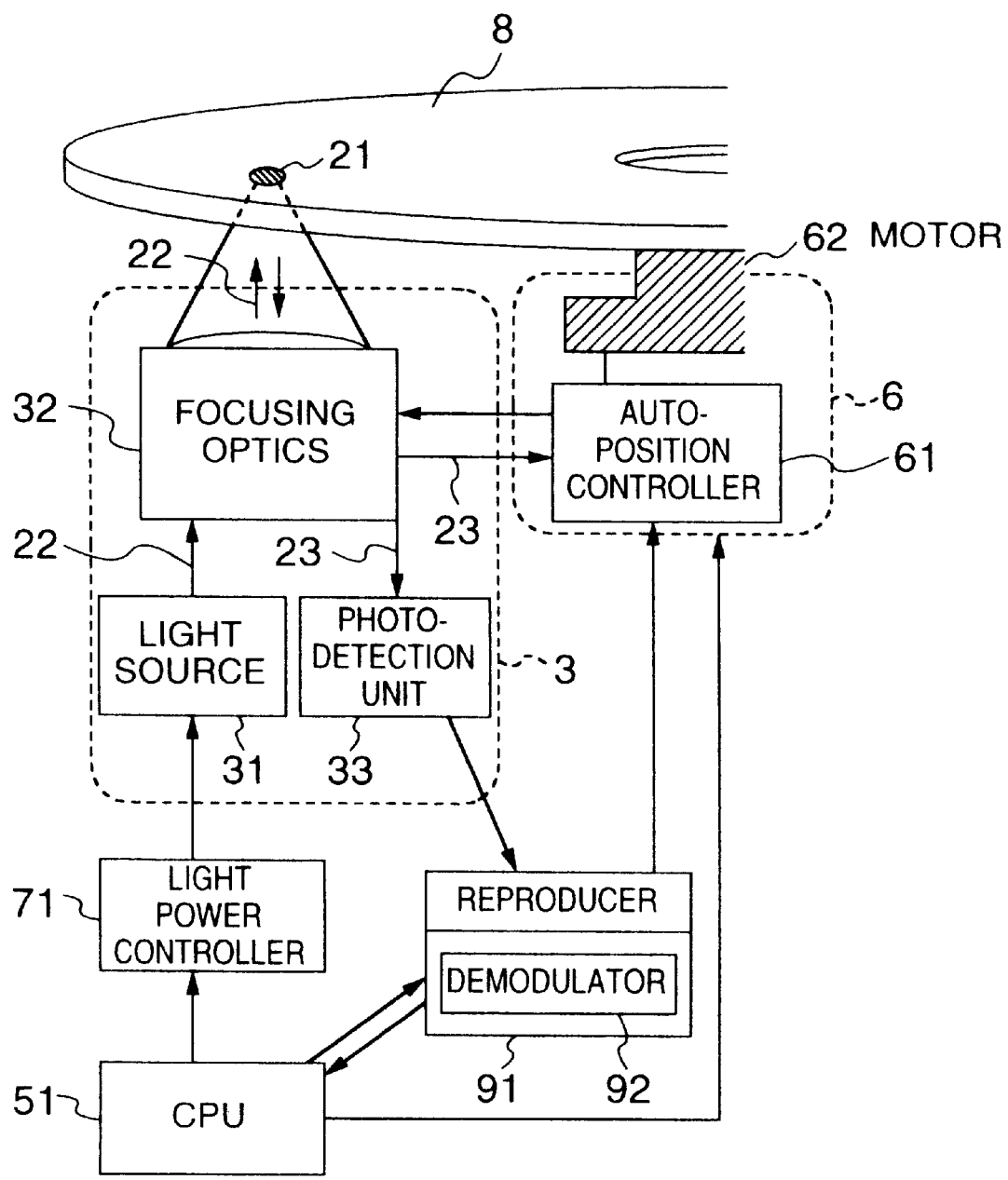
FIG. 3 is a block diagram of an apparatus for recording and reproduction of the optical recording medium used in the present invention.

Referring now to FIG. 3, there is illustrated an example of a configuration in which the optical recording medium of the present invention is applied to an optical recording/reproducing apparatus. In the apparatus, a semiconductor laser 311 having a wavelength of 680 nm and a collimating lens 312 are used as a light source 31. A beam profile former such as a prism may also be provided as necessary Power of the semiconductor laser is controlled by a light power controller 71 having the auto-light-power-control function. A light beam 22 emitted from the light source 31 is focused on a magneto-optical recording medium 8 by means of a focusing optics 32. The focusing optics 32 has at least one lens 321 and in this example, it also has a beam splitter 324. An objective lens 321 for focusing the light beam on the optical recording medium 8 is designed to have a numerical aperture of 0.6. Therefore, an optical spot 21 on the optical recording medium 8 has a diameter of 1.0 µm. The optical spot can be moved to a desired position on the optical recording medium 8 by means of a scanning unit 6. The scanning unit 6 includes at least a motor 62 for rotating the disk-like magneto-optical recording medium 8 and an auto-position controller 61 having the function of auto-focus control and auto-tracking. The auto-position controller 61 utilizes a reflected beam 23 from the magneto-optical recording medium 8 to cause a photodetection unit 33 to detect an optical spot position which is used for feedback control.

The optical spot position can be detected by detecting power of a diffracted light ray from a groove. The photodetection unit 33 is constructed of a lens, a beam splitter and a plurality of photodetectors, and output signals of the plurality of photodetectors are calculated to produce a servo signal and a reproduced signal.

Figure 2:
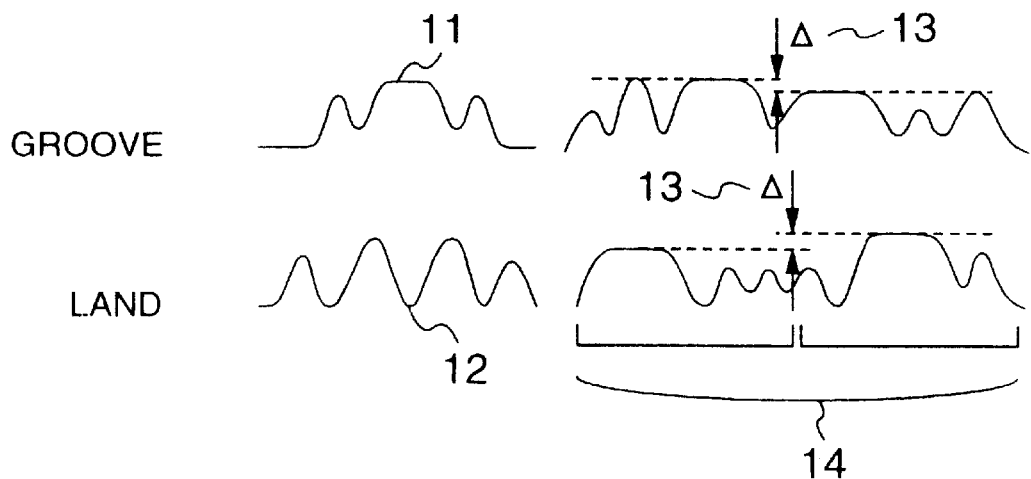
FIG. 2 is a waveform diagram of reproduced signals from the medium of FIG. 1.

With the optical recording medium as shown in FIG. 1 used, signals as designated at 14 in FIG. 2 are produced as prepit signals. The signal is inputted to an address detection unit to decode address data and at the same time, timings of signals of the first and second prepit areas are detected and on the basis of the timing information, the amplitude (averaged peak-to-peak amplitude) of the first prepit area and that of the second prepit area are stored. The thus stored amplitudes are compared with each other by means of an amplitude comparator to produce tracking offset information which in turn is fed back to the position moving unit (scanning unit). Referring to FIG. 2, when the optical spot scans a groove, a magneto-optical reproduction signal 11 and a corresponding prepit signal 14 (an upper one in the drawing) are produced and when the optical spot scans a land, a magneto-optical reproduction signal 12 and a corresponding prepit signal 14 (a lower one in the drawing) are produced. Since in this example the optical spot is slightly offset as shown in FIG. 1, an amplitude difference 13 takes place between a prepit signal from the first prepit area 831 and a prepit signal from the second prepit area 832. This amplitude difference corresponds to a tracking offset amount.

By using the apparatus of FIG. 3, the tracking offset could be reduced to ±0.03 μm or less even when various kinds of external disturbance such as aberration of the optical spot are taken into consideration. Under the nominal state devoid of optical aberration, the tracking offset was ±0.015 μm or less.

As described above, in the present invention, prepits are disposed on both sides of a virtual extension of the center line of a groove or a land as shown in FIG. 1. Consequently, offset is reduced to make tracking offset hardly occur. Since prepits do not exist on both sides of any specific position of the center line of a groove or a land, interference of prepit information between adjacent tracks does not take place within a reproduced spot and hence high-density narrow track recording can be ensured.

Further, if a tracking offset occurs as shown in FIG. 2, the tracking offset amount can be detected accurately by comparing amplitudes of signals of prepits located on both sides. Accordingly, by feedback-controlling the information indicative of a comparison result to the scanning unit, the tracking offset can be suppressed.

Furthermore, discrimination between the groove and the land can be effected with ease.

By using the optical recording medium of the present invention, the tracking offset can be suppressed to a practically sufficiently small level (0.03 μm or less) and besides, address data can easily be obtained even during high-density narrow track recording. Through the use of the optical recording/reproducing apparatus of the present invention, the tracking offset can readily be reduced by feedback control.

Embodiment 2

Figure 4:
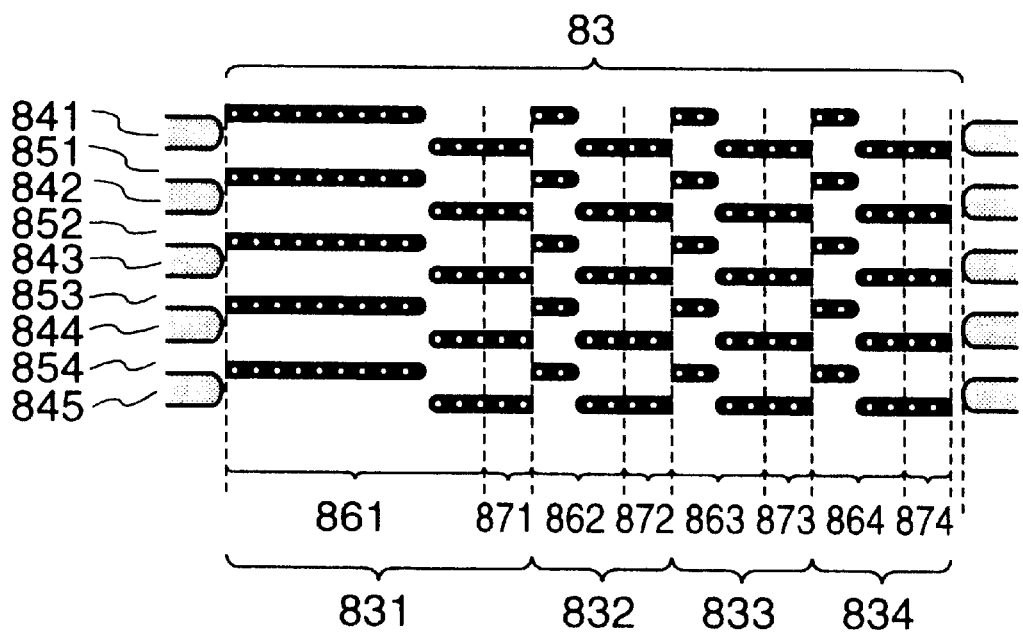
FIG. 4 is an enlarged fragmentary plan view of a second embodiment of the optical recording medium according to the present invention.

Referring now to FIG. 4, there is illustrated a second embodiment of the present invention. A medium of the present embodiment differs from that of embodiment 1 in that only synchronous information pits 861 to 864 are disposed on the upper side (as viewed in the drawing) of the center line of a groove 841, 842, 843, 844 or 845 and synchronous information pits 861 to 864 and address data pits 871 to 874 are both disposed on the lower side (as viewed in the drawing) of the center line of each of the grooves 84. Preferably, the address data pits 871 to 874 are arranged continuously to the synchronous information pits 861 to 864. For a land 85, the upper and lower side relation is inverted.

Being different from the embodiment 1, the present embodiment has address data arranged on only the upper or lower side of the center line of the groove or the land and therefore the same address data is allotted to the land and groove. In the present embodiment, four divisional prepits areas 831 to 834 are provided with the aim of improving the reliability of the prepit area but the prepit area is not always divided. In the present embodiment, the synchronous pit 861 in the first prepit area 831 are designed to have a longer length than the synchronous pits in the second to fourth prepit areas by taking into account the influence of aliasing of a signal which has passed through a low pass filter. Preferably, pits disposed on the upper and lower sides are spaced apart from each other by 0.5 μm or more from the view-point of fabrication of the medium. More preferably, they are spaced apart by a distance of about 1 μm which is the diameter of the reproduced optical disc spot.

Embodiment 3

Figure 5:
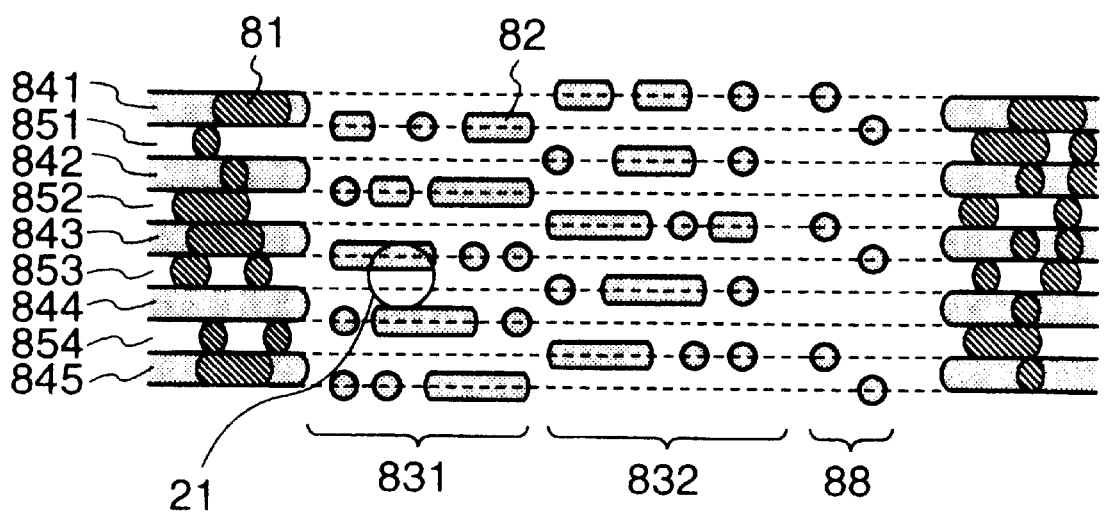
FIG. 5 is an enlarged fragmentary plan view of a third embodiment of the optical recording medium according to the present invention.

Referring to FIG. 5, there is illustrated a third embodiment in which identification marks 88 are used to discriminate the land from the groove In the present embodiment, identification marks 88 for discrimination between the land and the groove are provided independently of the prepit area in the embodiments 1 and 2.

In the present embodiment, a pair of pits (identification marks) 88 are arranged on the upper and lower (as viewed in the drawing) sides of the center line of a groove 841, 843 or 845 but they are not provided for a groove 842 or 844. On the assumption that an optical spot relatively moves from left to right as viewed in the drawing when the medium provided with the above identification marks is reproduced to provide a case of "presence" where the identification marks are seen by the optical spot and a case of "absence" where the identification marks are not seen, "presence, presence" is held for the groove 841, "absence, presence" is held for a land 851, "absence, absence" is held for the groove 842 and "presence, absence" is held for a land 852. Further, "presence, presence" is held for the groove 843, "absence, presence" is held for a land 853, "absence, absence" is held for the groove 844 and "presence, absence" is held for a land 854. Namely, either one of "presence, presence" and "absence, absence" is held for the groove and either one of "absence, presence" and "presence, absence" is held for the land. Accordingly, this can be utilized to effect discrimination between the land and groove on the basis of a reproduced signal. To secure reliability, a plurality of pairs of identification marks may preferably be provided and more preferably, the paired pits are spaced apart from each other by several μm or more in the circumferential direction or information track direction of the medium which is perpendicular to the radial direction. For example, the prepit area in the foregoing embodiments and the identification mark area may preferably be arranged alternately in the circumferential direction.

Embodiment 4

Figure 6:
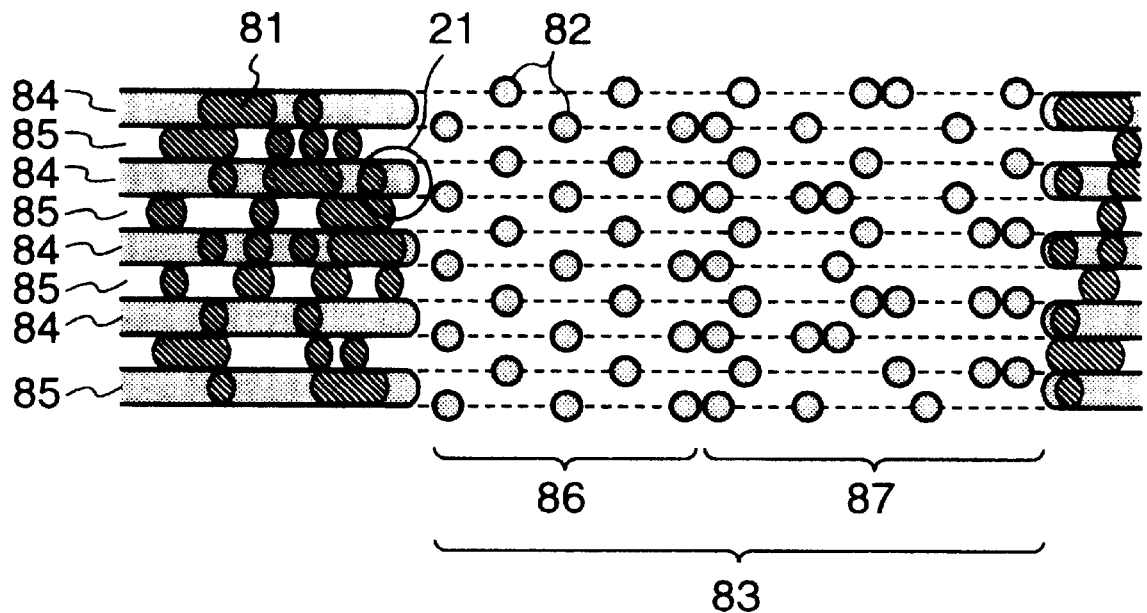
FIG. 6 is a similar view of a fourth embodiment of the optical recording medium according to the present invention.
Figure 7:
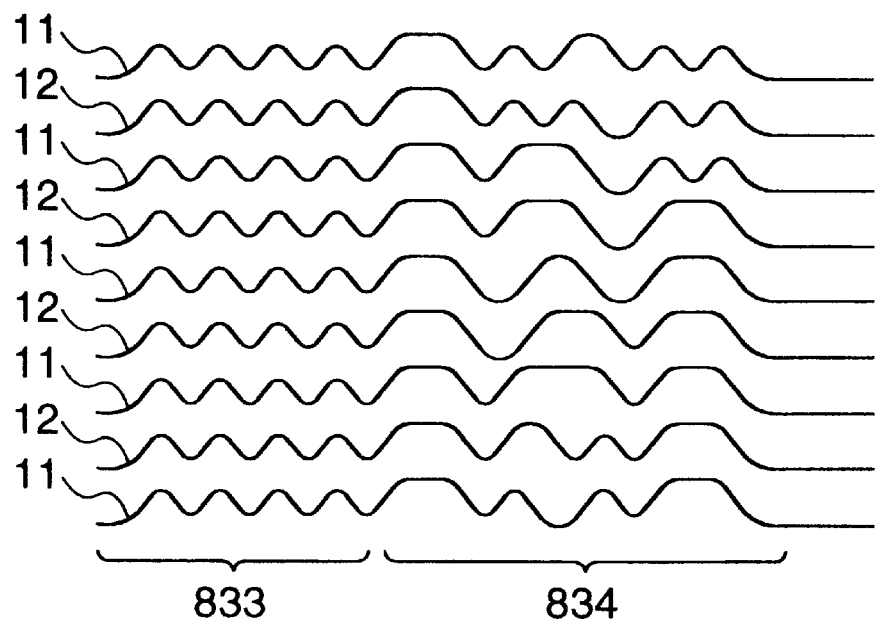
FIG. 7 is a waveform diagram of reproduced signals from the optical recording medium of FIG. 6.

Referring to FIG. 6, there is illustrated, in enlarged fragmentary plan view form, an optical recording medium according to a fourth embodiment of the present invention. Grooves 84 each having a width of 0.5 μm and a depth of 40 nm and lands 85 each having a width of 0.5 μm are arranged alternately and recorded marks 81 are formed on the two kinds of areas. In other words, each of the land 85 and groove 84 serves as a recording area. In a prepit region 83, any groove is not formed but substantially circular pits 82 (each having a diameter of 0.3 μm and a depth of 40 nm) are disposed on an extension of the boundary between a land and a groove. The prepit area is divided into a VFO (variable frequency oscillator) area 833 and an address area 834 as shown in FIG. 7. Especially, in the VFO area, pits 82 are disposed alternately on the upper and lower sides of the center line of a land 85. In the address area, pits 82 are disposed alternately at the same period as that in the VFO area. Accordingly, there are no pits which exist on both sides of a position of the center line of the land or the groove.

In addition, in the address area, data for a particular track is so encoded as to differ by one pit from data for an adjacent track. In other words, the data takes the form of a Gray code. With this construction, when an optical spot 21 scans, for example, a land 85, only pits on either one side are always reproduced and there is no fear that crosstalk will occur between the adjacent tracks. Therefore, address data distributed to the prepits can duly be reproduced without crosstalk. Since pits 82 for adjacent tracks do not adjoin to each other, they can therefore be formed with ease. Also, pits 82 are uniformly disposed on both sides of a track (a land or a groove) and hence the influence on a tracking servo signal which is caused by the pits 82 can be canceled. Accordingly, tracking offset can be suppressed to a minimum.

When the medium of the FIG. 6 embodiment is reproduced with the apparatus of FIG. 3, reproduced signals as shown in FIG. 7 are generated from the prepit area 83, indicating that data pieces which differ track by track can be obtained and therefore address data is recorded very highly efficiently. Thanks to the use of the Gray code, an address can be reproduced even in the course of inter-track access, ensuring suitability to high-speed access. Further, with the Gray code used, an error hardly occurs even in the presence of crosstalk, thus ensuring suitability to narrowing of tracks.

Embodiment 5

Figure 8:
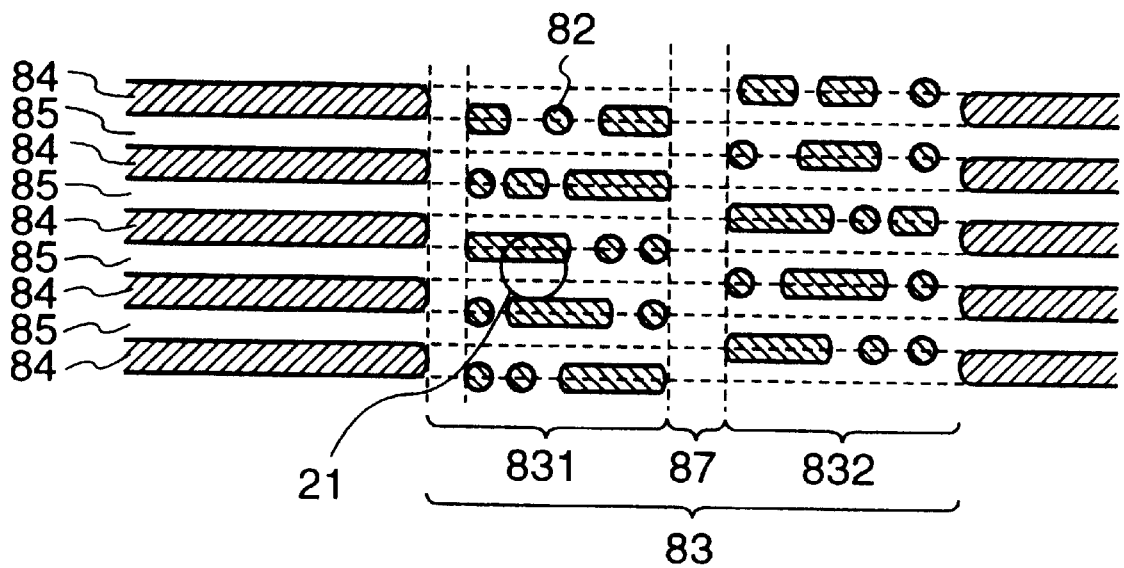
FIG. 8 is an enlarged fragmentary plan view of a fifth embodiment of the optical recording medium according to the present invention.

Referring now to FIG. 8, there is illustrated in enlarged fragmentary plan view form an optical recording medium according to a fifth embodiment 5 of the present invention. Groove 84 each having a width of 0.7 $\mu$m and a depth of 70 nm and lands 85 each having a width of 0.7 $\mu$m are arranged alternately in the radial direction and the two kinds of areas serve as information tracks on which recorded marks can be formed.

In other words, each of the land 85 and groove 84 serves as a recording area. In a prepit region 83, any groove is not formed but pits 82 are disposed on an extension of the boundary between the land and the groove. The prepit area is divided into zones which are arranged in the radial direction over about 1800 information tracks, that is, 900 grooves.

The zones are arranged concentrically of the whole of a disk in such a manner that 24 zones in total are in a disc having a radius of 30 to 60 mm. More specifically, in each zone, the number of prepit areas to be detected during one revolution, that is, the sector number is constant and the sector number is larger in an outer zone than in an inner zone.

Figure 9:
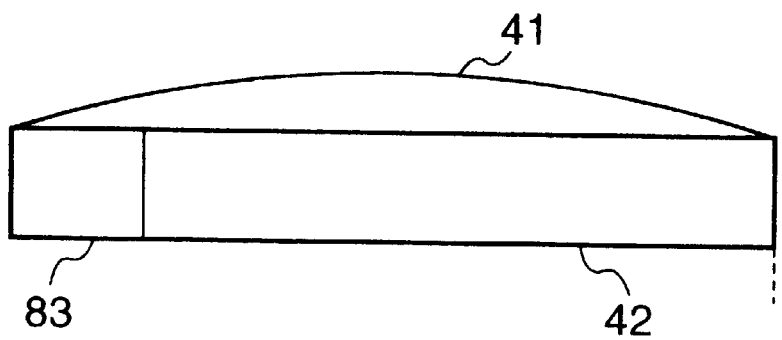
FIG. 9 is a diagram showing an information structure in the fifth embodiment of the optical recording medium according to the present invention.

An example of structure of each sector 41 is shown in FIG. 9. The sector 41 has a prepit area 83 at the head of a data recording area.

As shown in FIG. 8, the prepit area is divided into a first prepit area 831 and a second prepit area 832. In the first prepit area 831, pits 82 are arranged on the upper side (as viewed in the drawing) of the center line of a land 85 and in the second prepit area 832, pits 82 are arranged on the lower side of the center line of the land 85. Consequently, for example, when an optical spot 21 scans the land 85, only pits on either one side are always reproduced and there is no fear that crosstalk will occur between adjacent tracks. Accordingly, address data allotted to the prepits can duly be reproduced without crosstalk. Address data represented by the prepits is recorded in the form of a 1–7 modulation code (having a channel bit length of 0.2 $\mu$m). In other words, the linear recording density is 0.3 $\mu$m/bit.

Figure 10:
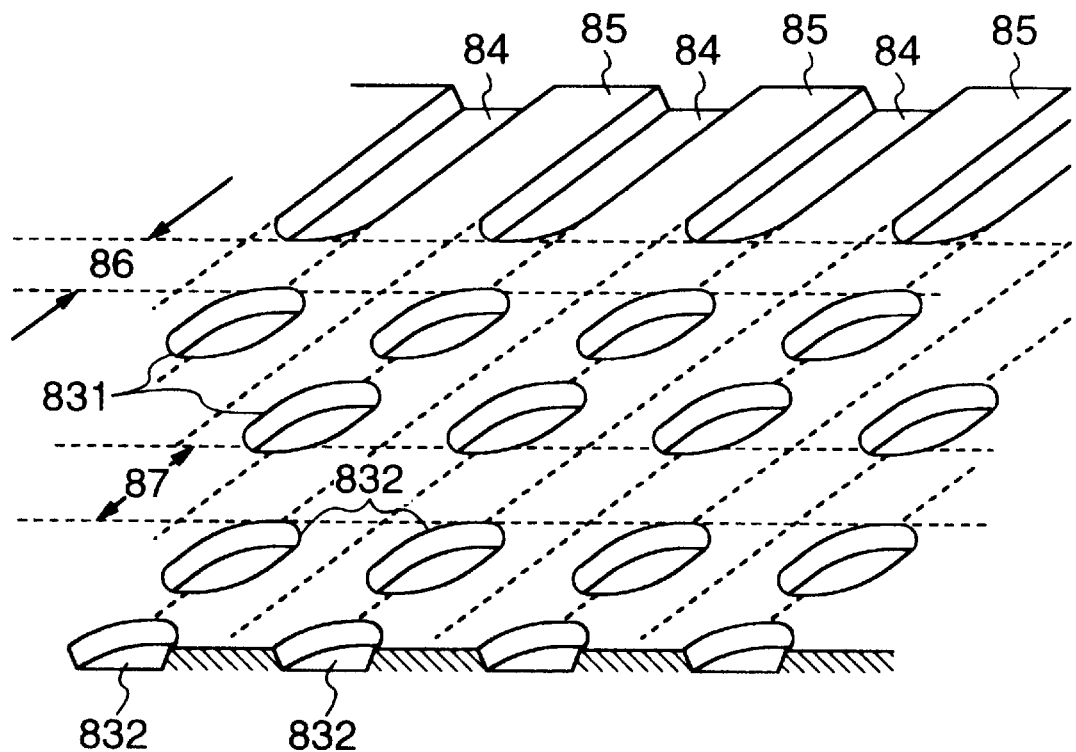
FIG. 10 is an enlarged fragmentary perspective view showing the relation between the prepit area and the groove in the fifth embodiment.

The relation between the prepit area and the groove in the present embodiment is illustrated in enlarged fragmentary section perspective view form in FIG. 10.

In the present embodiment, a gap area 187 is provided between the first and second prepit areas 831 and 832 to space them apart by about 1.0 $\mu$m. Since in this embodiment data is recorded pursuant to the 1–7 recording, the gap distance corresponds to a length of about 5 channel bits. The 5 channel bit length is exactly the middle length between the longest mark length (8 channel bit length) and the shortest mark length (2 channel bit length). Therefore, the gap area between the first and second prepit areas can be reproduced having a length which lies between the shortest mark length and the longest mark length even when the pits undergo changes in shape and position during formation of the pits and the optical spot undergoes a change in shape and a change in scanning position (servo offset), thus ensuring very high reliability. In this example, the marks are designed to undergo, at the worst, a total change in position which is suppressed to 0.6 $\mu$m (3 channel bit length) and therefore, the effective length (during reproduction) is 2 channel bits in the case of the shortest length and 8 channel bits in the case of the longest length to match the rule of the 1–7 modulation code, thus raising no problem during reproduction. If the detection length is longer than 8 channel bit length, then it will adversely interfere with a special synchronous pattern such as a recorded address mark. If the detection length is shorter than 2 channel bits, then a small mark results which is less than resolution of the reproduction optical spot and cannot be detected. Accordingly, it is preferable that the gap length be suppressed to the middle between the longest mark length and the shortest mark length as in the present embodiment.

Depending on the specification of a pit forming apparatus, the change in mark position can be suppressed to one channel bit length or less. In this case, the nominal gap length may be suppressed to 3 to 7 channel bit length but the pit forming apparatus for this purpose becomes expensive There is a high possibility that signals suffer an error attributable to a tracking offset during reproduction and therefore the medium is desired in which preferably, the gap length is exactly the middle between the longest mark length and the shortest mark length permissible for the recording as described hereinbefore.

In the present embodiment, pits 82 are uniformly disposed on both sides of the center line of a track (a land or a groove) and hence the influence on a tracking servo signal which is caused by the pits 82 can be canceled. Accordingly, the tracking offset can be suppressed to a sufficiently small level. In addition, for example, when a land 85 is reproduced, reproduction of address data at the second prepit area 832 is carried out continuously with reproduction of address data at the first prepit area region 831. Accordingly, when the two areas are united into one area in which information is arranged to provide address data for one track, an address (track number) of a land and that of a groove can be set independently of each other. In other words, by sequentially reproducing the address data pieces in the first and second prepit areas 831 and 832, discrimination between the land and the groove can be ensured.

More particularly, for reproduction of the groove, address data represented by prepits arranged in the first prepit area is made to be identical to that represented by prepits arranged in the second prepit area but for reproduction of the land, address data represented by prepits in the first prepit area is made to be different from that represented by prepits in the second area. When addresses represented by prepits in the first and second prepit areas are different from each other, a correlation may be set up between the two addresses and the efficiency of error correction code can be increased by utilizing the correlation.

Preferably, synchronous information (VFO) 86 and address data 87 may both be arranged in each of the first and second prepit regions.

While in this example the prepit area is divided into two of the first and second prepit areas, the number of division which is plural may suffice. For example, when the number of division is four as shown in FIG. 5, pits in the first and third prepit areas may be arranged on one side of a groove and pits in the second and fourth prepit areas may be arranged on the other side of the groove. By increasing the number of division of the prepit area, reliability against, for example, defects can be improved.

Here, a phase change recording material (GeSbTe) is used for the recording film Accordingly, the recorded mark is formed in the form of an amorphous domain.

Figure 11:
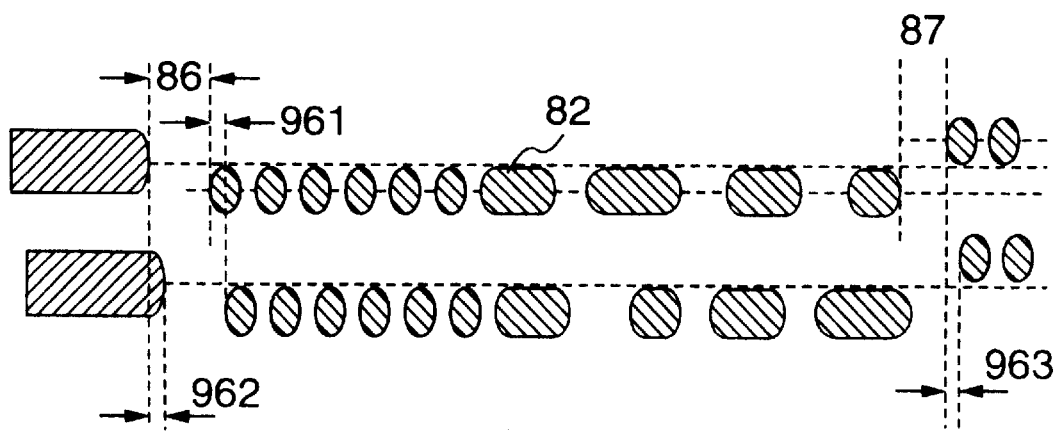
FIG. 11 is an enlarged fragmentary plan view showing details of positional displacement in the embodiments of the optical recording medium according to the present invention.

Referring now to FIG. 11, amounts of positional displacement 963 between prepit areas of adjacent tracks, 961 between prepits of adjacent tracks and 962 between grooves of adjacent tracks in the medium are illustrated in greater detail. In the actual medium, positional displacement sometimes occurs between pits of adjacent tracks owing to various causes taking place during pit formation. Because of the positional displacement amounts 961, 962 and 963, the length of gap areas 186 and 187 is increased or decreased.

In addition to the above positional displacement, various kinds of variations (aberration, servo error and the like) during reproduction also cause apparent positional displacement of reproduced signals. Accordingly, the positional displacement possibly leads to a serious problem. But in the present invention, the nominal length of the gap area is set to the middle length between the shortest mark length and the longest mark length pursuant to the 1–7 modulation code and hence a positional displacement amount of ±0.6 μm is permissible.

The optical recording medium shown in FIG. 8 can be reproduced with the apparatus shown in FIG. 3 in a similar manner to that described in connection with embodiment 1, bringing about advantages that tracking offset can be reduced to ±0.03 μm or less even when various kinds of external disturbance such as optical aberration are taken into account and in particular, it can be reduced to ±0.015 μm or less under the nominal state devoid of optical aberration.

Embodiment 6

While the embodiment of FIG. 8 uses the 1–7 modulation coding as the recording modulation coding, the present embodiment uses eight to fourteen modulation (EFM) recording The channel bit length is about 0.2 μm. In the present recording, the shortest mark length is 3 channel bit length and the longest mark length is 11 channel bit length. Practically, a mark having a length of 12 channel bits or more is available but this type of mark is limited to a special application such as a synchronous pattern. Accordingly, data must avoid inclusion of a pattern which may possibly interfere with the special pattern. The prepit area, groove and land are arranged similarly to the embodiment 5 of FIG. 8 excepting points to be described later. Namely, they are arranged as shown in FIG. 10 and especially, each groove and each have a width of about 0.75 μm and each groove and each prepit have a depth of about 0.075 μm.

Figure 12:
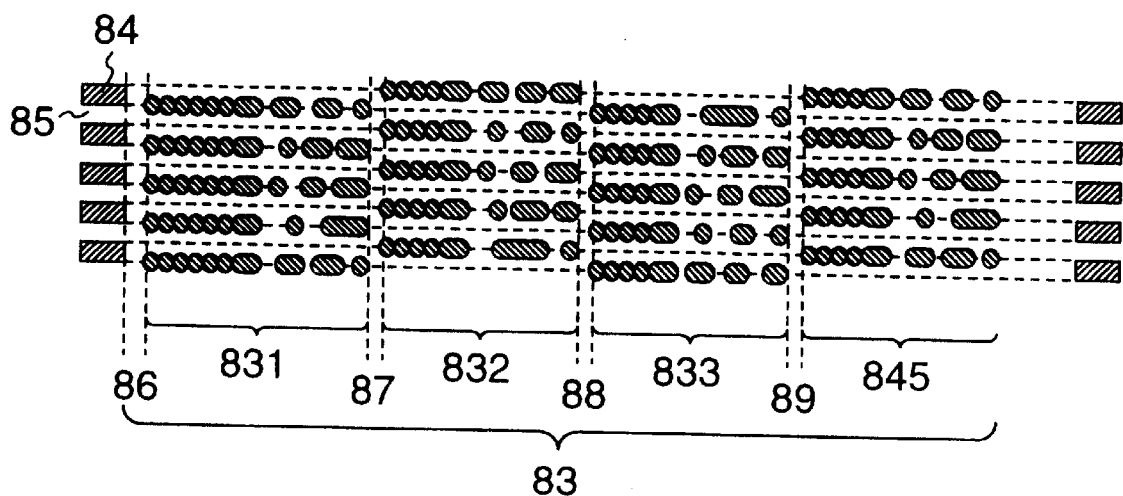
FIG. 12 is an enlarged fragmentary plan view of a sixth embodiment of the optical recording medium according to the present invention.

In the present embodiment, the prepit area and the groove are disposed as shown in FIG. 12. Four prepit areas 831, 832, 833 and 834 are allotted to the head of one sector. In each prepit area, a VFO area for synchronization to reproduced signals and an address area recording address data of the track and sector are arranged sequentially. Start positions of pits as well as end positions are so arranged as to be substantially aligned in the radial direction and a gap area 186 is provided between the end of the groove and the start of the pit area. Likewise, a gap area 187, 188 or 189 is provided between adjacent prepit areas.

Figure 13:
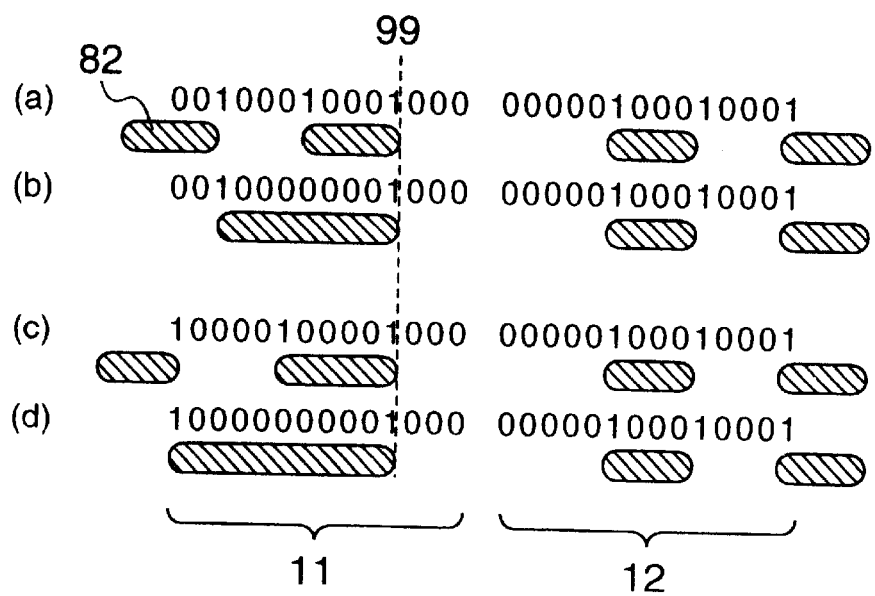
FIG. 13 is a diagram showing an example of a modulated code in the sixth embodiment of the optical recording medium according to the present invention.

As described previously, details of positional displacement between the start position of a pit and the start position of a succeeding pit is depicted in FIG. 11. With the displacement as shown in FIG. 11, the effective length of the gap area 186 is decreased or increased as in the embodiment 5 of FIG. 8. In order to align ends of final pits of the prepit areas 831, 832 and 833 in the radial direction, an additional pit pattern 110 as shown in FIG. 13 is used. The additional pattern selected from four types (a), (b), (c) and (d) in accordance with the preceding data is used. Through this, trailing edge positions 99 of the final pits as shown in FIG. 13 can always be aligned to the same position regardless of the preceding data and the gap length and pit length can be limited to the lengths allowed for the modulation code. In this manner, the gap area between the succeeding prepit area 120 and the trailing edge position 99 of the final pit can be set to the middle length between the longest mark length and the shortest mark length pursuant to the modulation coding, so that the margin can be greatly increased during prepit formation and reproduction as in the embodiment 5.

In the foregoing embodiments, the medium of the phase change recording material is described but it may be of another material to attain the advantages of the present invention. For example, a magneto-optical recording film may be used as the recording film. In addition, the modulation code has been described as being of 1–7 and 8/14 coding but it may be of another type in which the previously described EFM is extended.

According to the present invention, in the optical recording medium having the lands and grooves, the substrate can be fabricated with a simple mastering apparatus and replica can also be prepared with ease, with the result that the medium fabrication margin and readout margin which are practically sufficiently large can be ensured. Accordingly, a cheap and high-density optical recording medium can be provided.

We claim:

1. An optical recording medium having grooves and lands alternately provided in a radial direction on a substantially circular substrate, information recording areas formed in both of said grooves and said lands, and interruption areas intervening between parts of said grooves,
   wherein, in an interruption area, first information marks are disposed on a virtual extension of a first boundary between one groove and one adjacent land and second information marks are disposed on a virtual extension of a second boundary between said one groove and another adjacent land, wherein said first and second information marks do not exist at opposing positions on both said first and second boundaries of said one groove;
   wherein said first and second information marks include at least synchronous information.

2. An optical recording medium according to claim 1, wherein the first and second information marks are prepits formed on the substrate.

3. An optical recording medium according to claim 1, wherein said first information marks include synchronous information which is shared between said one groove and said one adjacent land.

4. An optical recording medium according to claim 1, wherein said second information marks include synchronous information which is shared between said one groove and said other adjacent land.

5. An optical recording medium according to claim 1, wherein said first and second information marks enable tracking control.

6. An optical recording medium according to claim 1, wherein said second information marks include address information.

7. An optical recording medium according to claim 1, wherein both said grooves and said lands serve as recording tracks, said recording track being divided into recording units in a circumferential direction, said interruption areas extending along a plurality of recording tracks in the radial direction of the optical recording medium and the interruption area being part of a recording unit.

8. An optical recording medium according to claim 2, wherein a groove and a prepit have the same depth which is 70 nm or less.

9. An optical recording medium according to claim 2, wherein a groove and a land have substantially the same width which is between 0.3 $\mu$m and 0.75 $\mu$m.

10. An optical recording medium according to claim 2, wherein the smallest one of said prepits has a diameter which is smaller than a width of said land.

11. An optical recording medium according to claim 2, wherein the smallest one of said prepits has a diameter which is smaller than a width of each of said groove and land and which is in the range of 0.25 $\mu$m to 0.55 $\mu$m.

\* \* \* \* \*

UNITED STATES PATENT AND TRADEMARK OFFICE
CERTIFICATE OF CORRECTION

PATENT NO. : 5,982,738
DATED : November 9, 1999
INVENTOR(S) : Harukazu MIYAMOTO et al.

It is certified that error appears in the above-identified patent and that said Letters Patent is hereby corrected as shown below:

On title page, item 30 Foreign Application Priority Data replace "Oct. 19,1995 [JP] Japan 7-270872

Nov. 20, 1995 [JP] Japan 7-300961"

with -- Oct. 19,1995 [JP] Japan 7-270872

Nov. 20, 1995 [JP] Japan 7-300961

Feb. 14, 1995 [JP] Japan 7-024949--

Signed and Sealed this

Twenty-second Day of August, 2000

Attest:

Q. TODD DICKINSON

*Attesting Officer*　　　　　　*Director of Patents and Trademarks*